(12) United States Patent
Lundeberg et al.

(10) Patent No.: US 7,370,663 B2
(45) Date of Patent: May 13, 2008

(54) BARRIER DEVICE FOR FLUID SYSTEM COVER

(75) Inventors: Wayne A. Lundeberg, Tucson, AZ (US); Renato J. Sasselli, Tucson, AZ (US)

(73) Assignee: Catalina Tool & Mold, Inc., Tuscon, AZ (US)

( * ) Notice: Subject to any disclaimer, the term of this patent is extended or adjusted under 35 U.S.C. 154(b) by 471 days.

(21) Appl. No.: 10/786,459

(22) Filed: Feb. 25, 2004

(65) Prior Publication Data

US 2005/0005970 A1    Jan. 13, 2005

Related U.S. Application Data

(60) Provisional application No. 60/450,041, filed on Feb. 26, 2003.

(51) Int. Cl.
*F16L 5/00* (2006.01)
(52) U.S. Cl. .............. 137/371; 137/377; 220/DIG. 19; 215/357; 411/510
(58) Field of Classification Search .............. 137/371, 137/377, 382; 220/DIG. 19; 411/510; 215/357, 215/297, 302
See application file for complete search history.

(56) References Cited

U.S. PATENT DOCUMENTS

| 906,886 | A | * | 12/1908 | Jacob | 137/368 |
|---|---|---|---|---|---|
| 1,029,719 | A | * | 6/1912 | Saucedo | 137/371 |
| 1,229,429 | A | * | 6/1917 | Farley | 137/371 |
| 1,310,521 | A | * | 7/1919 | Crall | 137/371 |
| 1,349,610 | A | * | 8/1920 | Gibney | 137/371 |
| 1,867,041 | A | * | 7/1932 | Walters | 29/278 |
| 2,217,097 | A | * | 10/1940 | Brooks | 220/324 |
| 3,363,797 | A | * | 1/1968 | Roese | 137/371 |
| 3,761,999 | A | * | 10/1973 | Morgan | 24/16 PB |
| 3,771,199 | A | * | 11/1973 | Eldringhoff | 24/113 R |
| 4,163,503 | A | * | 8/1979 | McKinnon | 220/484 |
| 4,570,306 | A | * | 2/1986 | Eyler | 24/114.3 |
| 5,131,613 | A | * | 7/1992 | Kamiya et al. | 248/74.3 |
| 5,250,049 | A | * | 10/1993 | Michael | 606/72 |
| 5,368,261 | A | * | 11/1994 | Caveney et al. | 248/73 |
| 6,022,351 | A | * | 2/2000 | Bremer et al. | 606/72 |
| 6,719,513 | B1 | * | 4/2004 | Moutousis et al. | 411/510 |

* cited by examiner

*Primary Examiner*—Eric Keasel
*Assistant Examiner*—Craig Price
(74) *Attorney, Agent, or Firm*—Lawrence R. Oremland, P.C.

(57) ABSTRACT

A new and useful barrier device for a utility system cover is provided. The barrier device is designed to be coupled to a utility system cover (e.g. a water meter cover), in a way that effectively seals the opening in the cover against ingress of dirt, debris, animals, etc. Moreover, the barrier device also provides a structure that enables a hook like tool to engage and manipulate the coupled barrier device and cover, while maintaining the barrier against ingress of dirt, debris, animals, etc. The barrier device includes a hood with a border that at least partially flattens against a utility system cover as the baffler device is coupled to the utility system cover, so that the border of the hood and the utility system cover combine to form a baffler to materials and objects near the border of the hood. A stem extends from the hood, and is pressed into the utility system cover, in a way that effectively couples the baffler device with the cover. For covers that are too thick for the one piece cap structure, extender structure is provided, to extend the thickness of the cover(s) to which the barrier structure can be coupled.

2 Claims, 6 Drawing Sheets

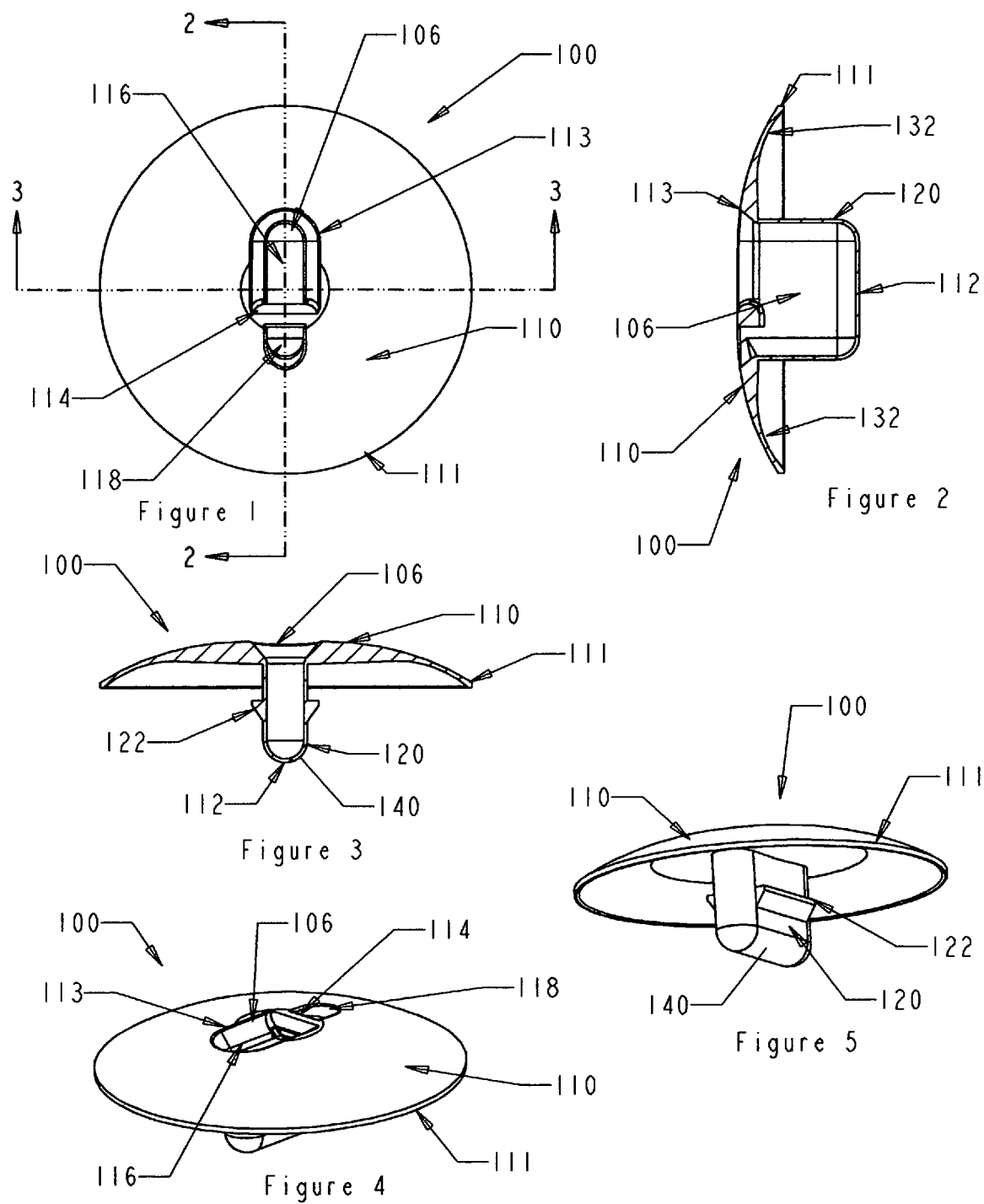

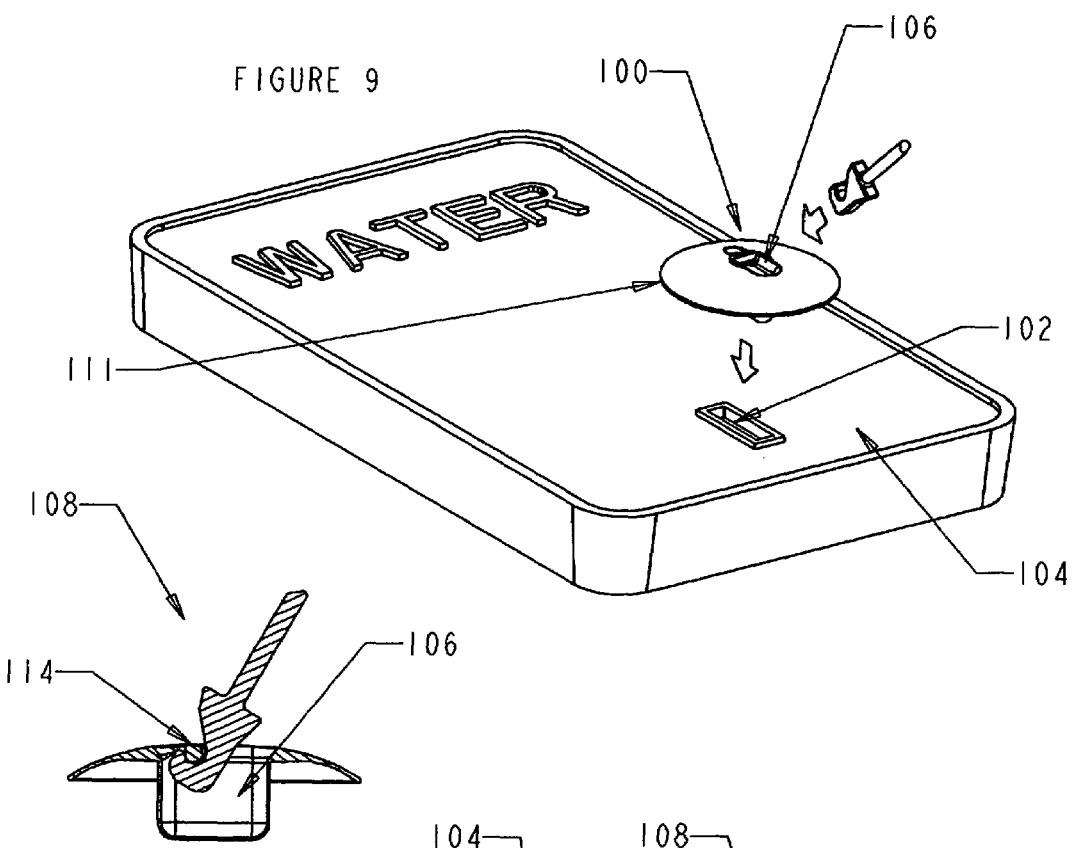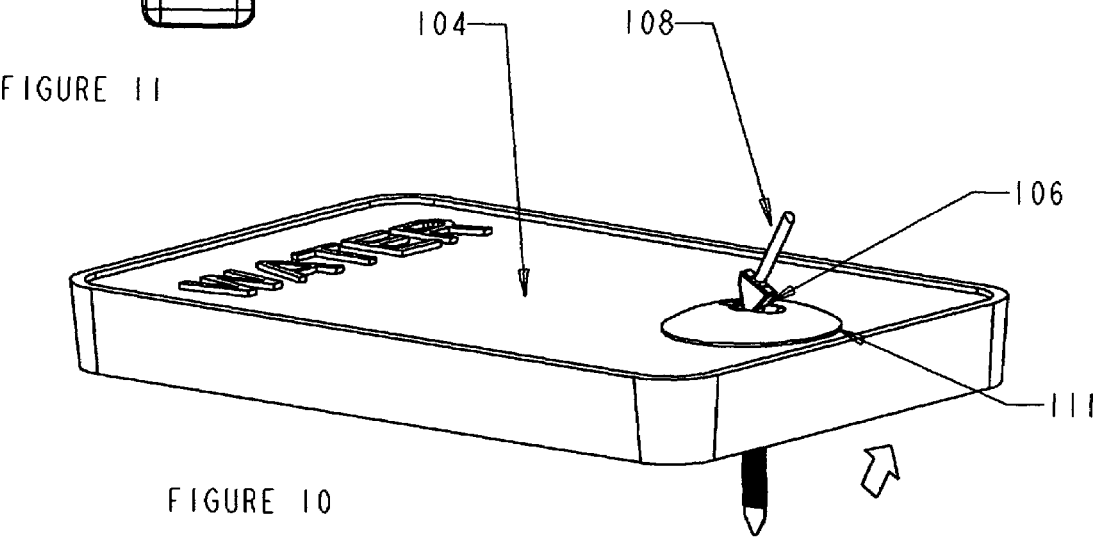

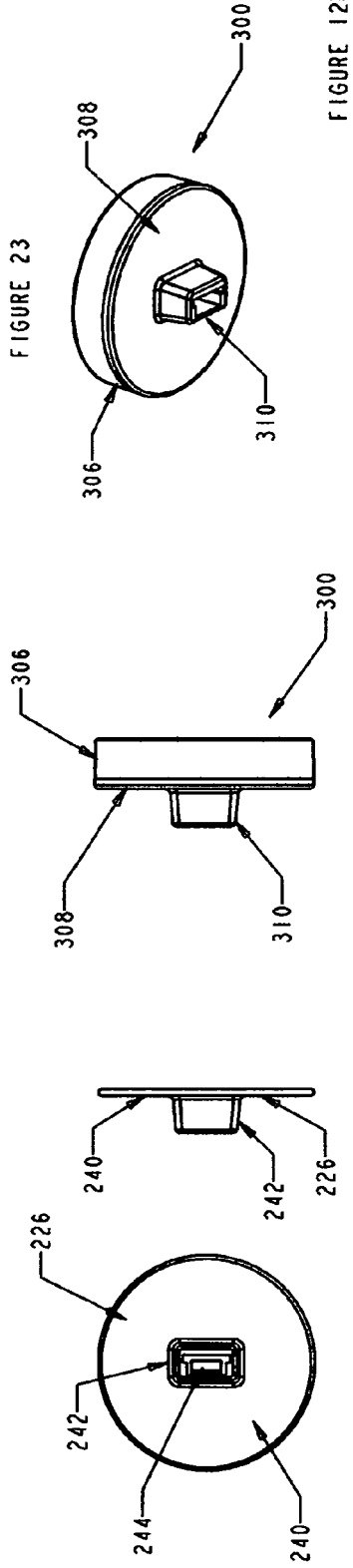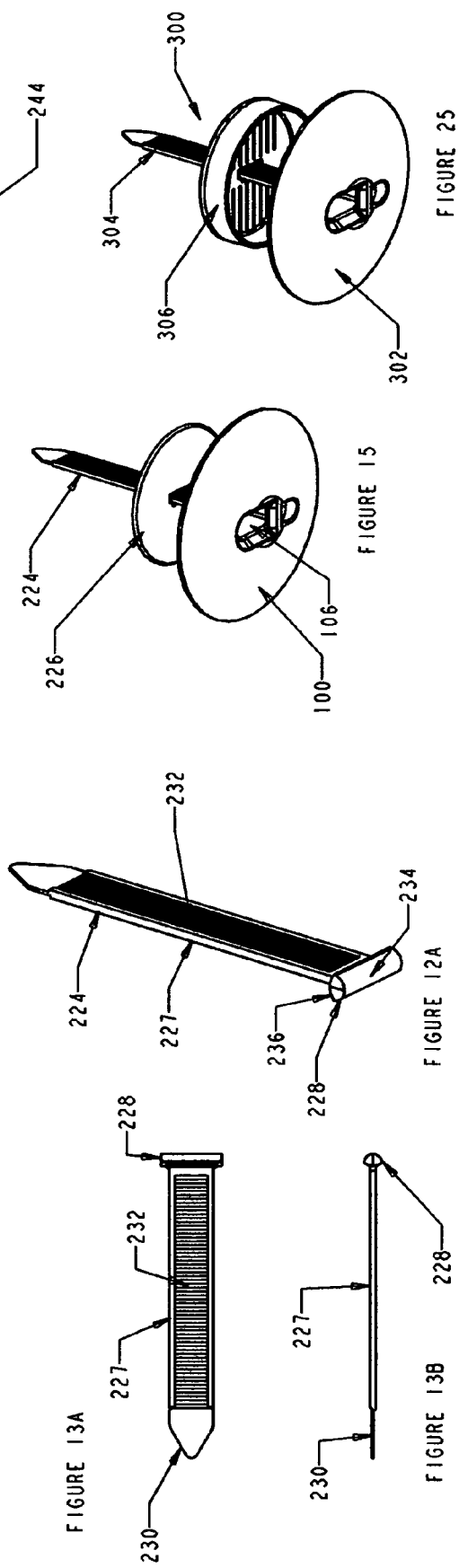

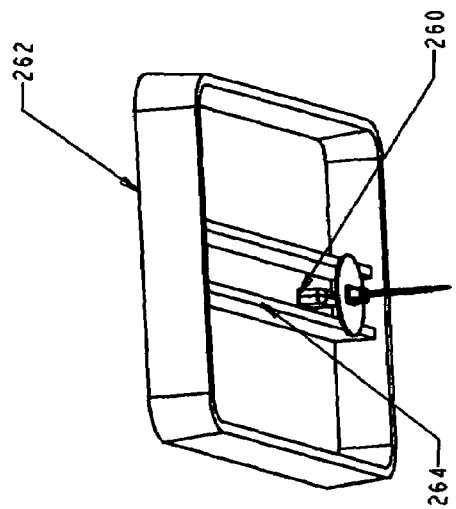
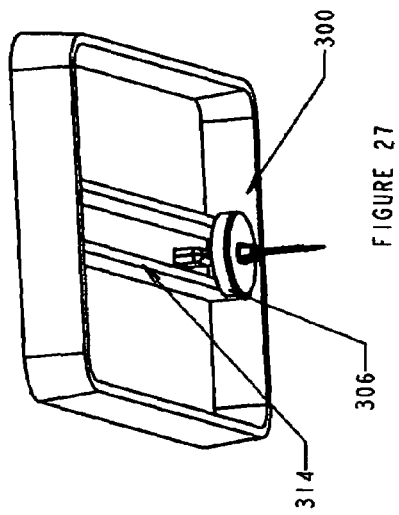
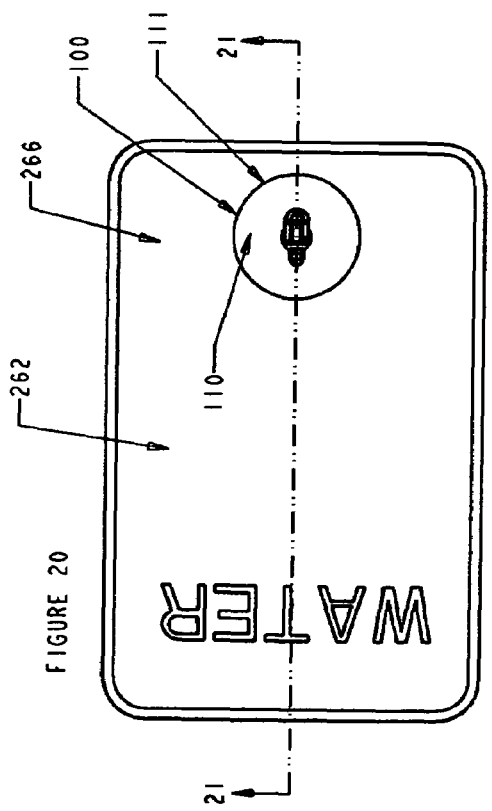
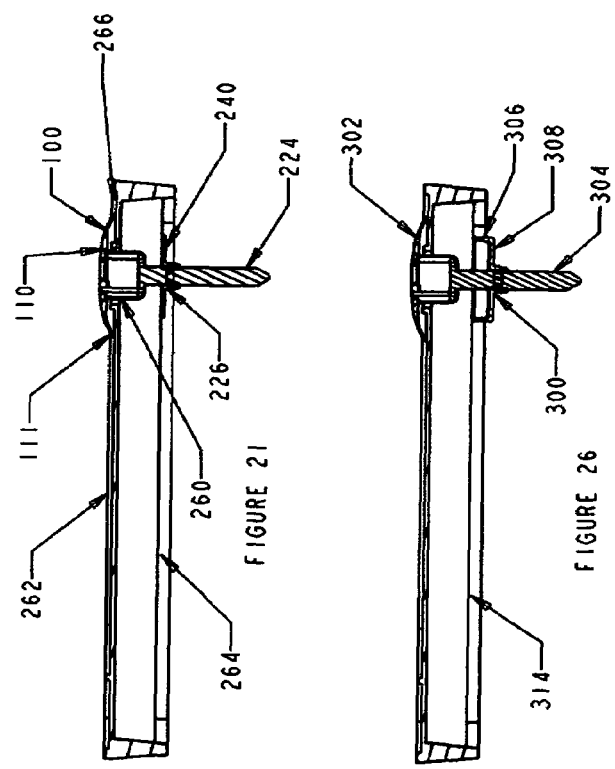

ND SUMMARY OF THE
BARRIER DEVICE FOR FLUID SYSTEM COVER

RELATED APPLICATION/CLAIM OF PRIORITY

This application is related to and claims priority from U.S. provisional application Ser. No. 60/450,041, filed Feb. 26, 2003, which provisional application is incorporated by reference herein.

BACKGROUND AND SUMMARY OF THE INVENTION

The present invention relates to a barrier device for a fluid system cover, such as a water meter cover that is manipulated to enable access to the water meter.

Typically, a municipal water system includes underground conduits that are disposed below street and/or sidewalk levels, and contain water meters at strategic locations in the system. An opening in a street or sidewalk system provides access to a water meter, and a water meter cover typically covers the opening and provides a relatively continuous surface upon which pedestrians can walk or vehicles can travel. A water meter cover typically comprises a relatively heavy metal plate like structure that inserts into the opening, and which is manipulated by a person seeking access to the water meter. In the applicants' experience, a water meter cover typically includes an access opening extending through the metal plate, and into which a person seeking to manipulate the cover can insert a hook like tool.

The access opening in a water meter cover, if uncovered, can provide access of dirt, debris, animals, etc, to the water meter, and that is not desirable. However, if the access opening in the water meter cover is covered up, the ability to engage the cover with a tool may be limited or restricted, and that is also not desirable.

The present invention addresses those and other issues in a fluid system cover, by providing a new and useful barrier device designed to be coupled to a fluid system cover (e.g. a water meter cover), in a way that effectively seals the access opening in the cover against ingress of dirt, debris, animals, etc.

Moreover, the present invention provides a barrier device that, in its preferred form, also provides a structure that enables a hook like tool to engage and manipulate the coupled barrier device and cover.

A barrier device according to one preferred form of the present invention comprises a one-piece cap structure configured to be coupled to a fluid system cover. The one piece cap structure includes a hood with a border configured to at least partially flatten against a fluid system cover as the cap structure is being coupled to the fluid system cover, so that the border of the hood and the fluid system cover combine to form a barrier to materials and objects near the border of the hood.

In its preferred form, the one-piece cap structure includes a recess designed for engagement by a tool, to enable a coupled barrier device and cover to be manipulated by the tool.

In addition, the present invention provides additional features that are useful with fluid system covers, and are particularly useful with water meter covers. For example, the barrier device of the present invention is designed to be coupled with covers whose thickness can vary over a predetermined range and which will still provide its new and useful features with covers whose thickness varies over that predetermined range.

Moreover, according to another preferred form of the present invention, structure is provided that can be integrally connected to the one piece cap structure, and which can further extend the thickness range of the fluid system covers with which the cap structure can be used.

Further features and objectives of the present invention will become apparent from the following detailed description and the accompanying drawings.

DESCRIPTION OF THE DRAWINGS

FIG. 1 is a top view of a barrier device formed according to the principles of the present invention;

FIG. 2 is a vertical cross section of the barrier device of FIG. 1, taken from the direction 2-2;

FIG. 3 is a horizontal cross section of the barrier device of FIG. 1, taken from the direction 3-3;

FIG. 4 is a perspective top view of the barrier device of FIG. 1;

FIG. 5 is a perspective bottom view of the barrier device of FIG. 1;

FIG. 9 is an exploded perspective view of a water meter cover, a barrier device according to the present invention and a hooked lifting tool;

FIG. 10 is a perspective view of a lifting tool engaged with a coupled barrier device and water meter cover;

FIG. 11 is a sectional view showing the hooked lifting tool engaged with the barrier device;

FIGS. 12a and 12b are perspective views of a stem extender and locking member, respectively, that can be integrally coupled with the barrier device of FIGS. 1-11, to further extend the thickness of fluid system covers with which the barrier device can be used;

FIGS. 13a and 13b are front and right side views, respectively, of the stem extender structure of FIG. 12a;

FIGS. 14a and 14b are top and side views, respectively, of the locking member of FIG. 12b;

FIG. 15 is a perspective view of the stem extender and the locking member of FIGS. 12a and 12b integrally coupled with a cap structure of the type shown in FIGS. 1-11;

FIG. 20 is a top view of a water meter cover, with the barrier structure of FIGS. 15-19 coupled thereto;

FIG. 21 is a sectional view of the water meter cover and barrier device of FIG. 20, taken from the direction 21-21;

FIG. 22 is a perspective view of the water meter cover and barrier device of FIG. 20, taken from the underside of the water meter cover;

FIG. 23 is a perspective view of another configuration for a locking member that can be used with a stem extender, according to the principles of the present invention;

FIG. 24 is a side view of the locking member of FIG. 23;

FIG. 25 is a perspective view of a cap structure with a stem extender and a locking member of the type shown in FIG. 23;

FIG. 26 is a sectional view of a water meter cover and barrier device formed with a cap structure with stem extender and locking member of the type shown in FIGS. 23-25; and FIG. 27 is a perspective view of the water meter cover and barrier device of FIG. 26, taken from the underside of the water meter cover.

DETAILED DESCRIPTION

Figure 6:
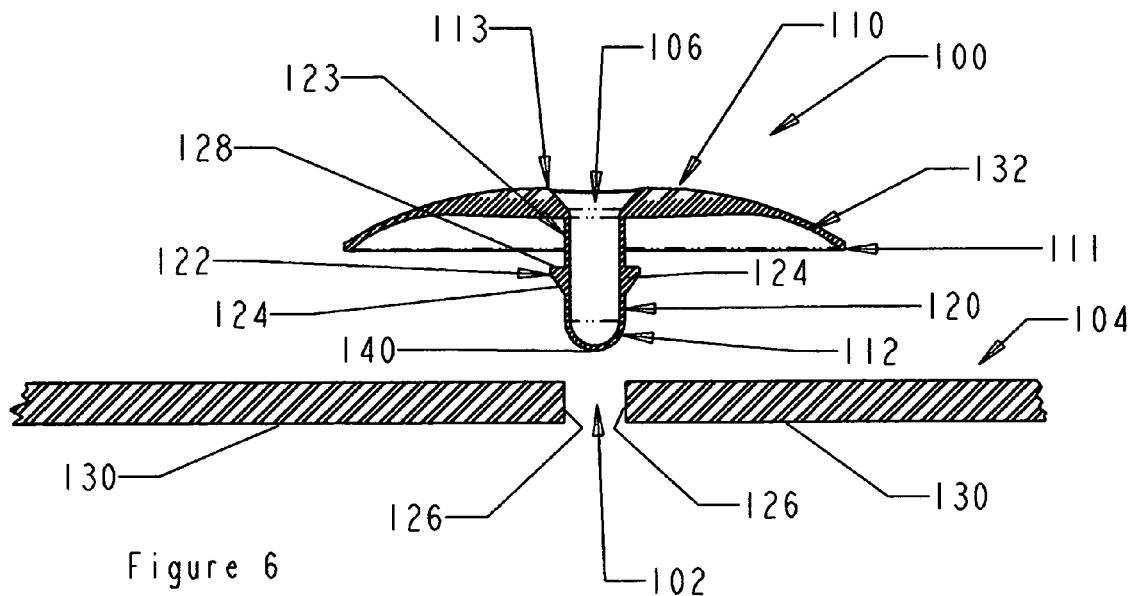
FIG. 6 is a sectional view of barrier device according to the present invention and a water meter cover, showing the barrier device before it is coupled to the water meter cover.

As described above, the present invention provides a new and useful barrier device for a fluid system cover, and is particularly useful with a water meter cover. The principles of the invention are described below in connection with a barrier device for a water meter cover. However, from that description, the manner in which the principles of the invention can be used to provide a barrier device for various types of fluid system covers will be apparent to those in the art.

Referring to the figures, the barrier device of FIGS. 1-11 comprises a one-piece cap structure 100 designed to be inserted into a tool access opening 102 in a residential or commercial water meter cover 104. The one piece cap structure 100 is preferably molded of a synthetic resin such as polypropylene with UV protection, and when coupled to a water meter cover 104 is intended to form a barrier to prevent infiltration of dirt, debris, insects, small rodents, etc. into the area of the water meter.

The one-piece cap structure 100 includes a recess 106 configured to allow a hooked tool 108 to be inserted and connected to the cap structure. Once the cap structure is coupled with a water meter cover, a hooked tool 108 can be used to lift the coupled cap structure and cover from the meter box, thus restoring the original intent of the tool access opening 102. FIG. 10 illustrates a hooked tool 108 engaged with a coupled cap structure 100 and water meter cover 104.

The one piece cap structure 100 has a relatively large domed shaped hood 110 which has a perimeter 111. The domed shape of the hood 110 allows the perimeter 111 of the hood to compress against the meter cover 104 as the cap structure is being coupled to the meter cover, thereby forming a tight seal around the hood perimeter. The domed shape of the hood 110 also forms part of self-adjusting structure of the barrier device that enables it to function with water meter covers whose thickness can vary over a predetermined range.

The recess 106, which allows insertion of the lifting tool 108, has a closed end 112, so that the recess does not extend completely through the cap structure. Thus, the recess, while providing access to a lifting tool 108, closes the tool access opening 102 of the cover 104, so that the recess also forms part of the barrier feature of the cap structure 100. At the top (or mouth) 113 of the recess there is a bar 114, which extends across the mouth, and enables a hooked lifting tool 108 to engage the cap structure (see FIGS. 9, 10, 11), and to manipulate a coupled cap structure and water meter cover. The bar 114 divides the recess into a relatively larger portion 116 and a relatively smaller portion 118 (see FIGS. 1, 4). The relatively larger portion 116 is generously beveled to facilitate access of the lifting tool 108. The relatively smaller portion 118 allows evacuation of debris from the recess during insertion of the lifting tool. Specifically, as the lifting tool is inserted through the larger portion 116 of the recess, the bottom of the tool can effectively push at least some materials that may have collected in the recess out of the recess through the smaller portion 118 of the recess.

Figure 7:
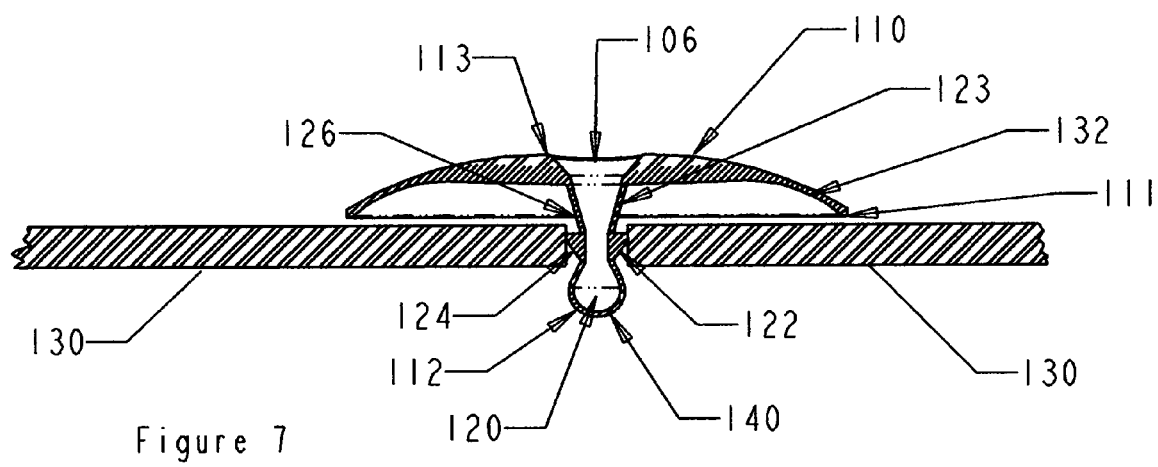
FIG. 7 is a section view of the barrier device and meter cover, showing the function of the hooks or barbs during insertion of the barrier device into the access opening in the cover.
Figure 8:
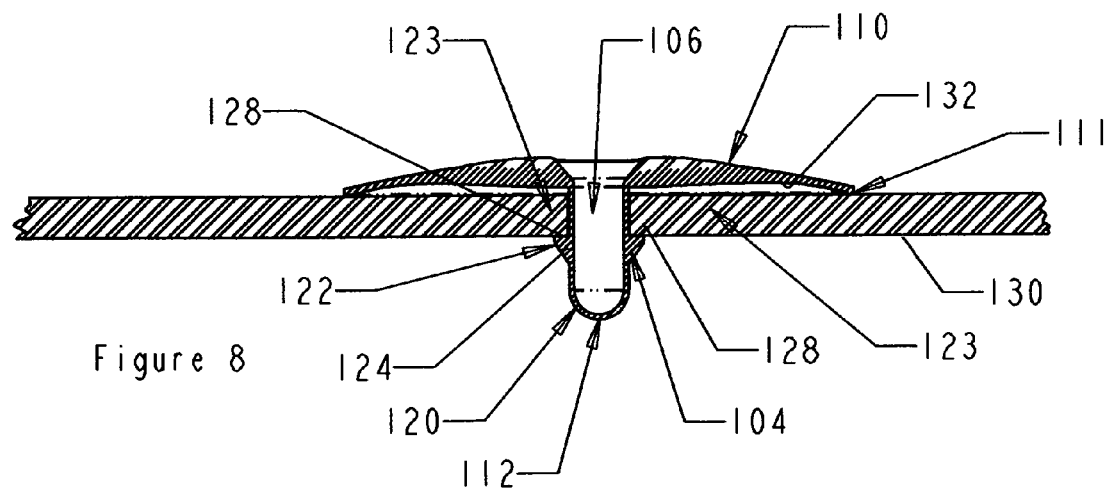
FIG. 8 is a section view showing the barrier device coupled to the water meter cover.
Figure 18:
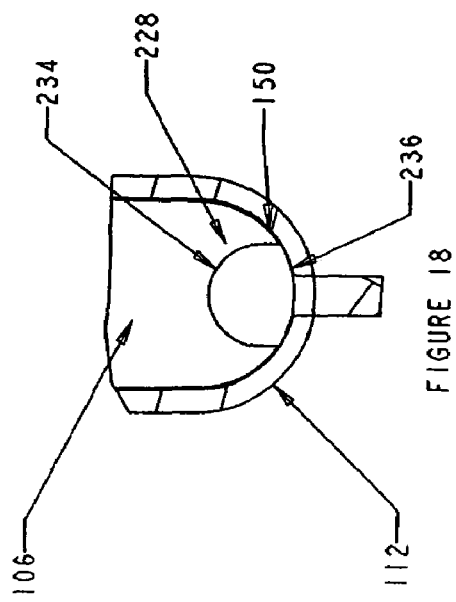
FIG. 18 is an enlarged view of the area 18-18 of FIG. 17.
Figure 19:
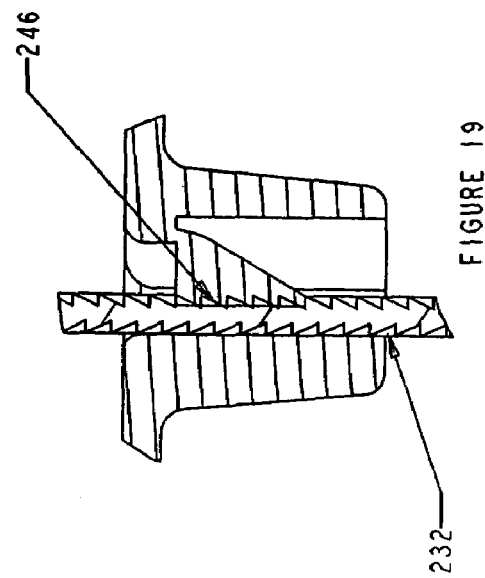
FIG. 19 is an enlarged view of the area 19-19 of FIG. 17.
Figure 17:
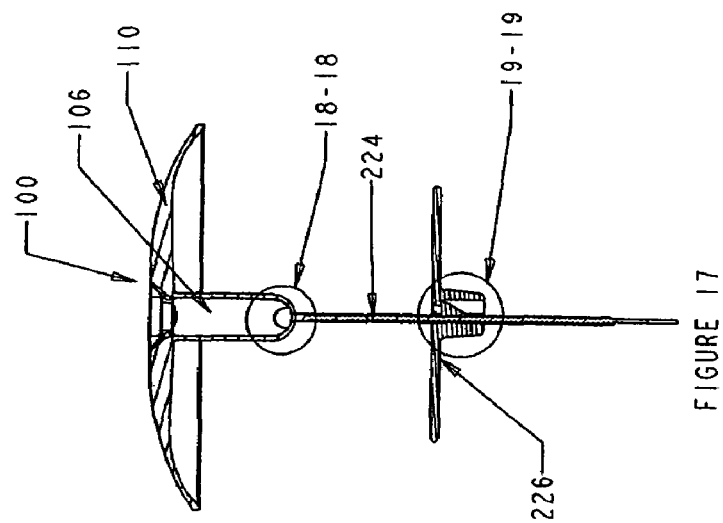
FIG. 17 is a sectional view of the structure of FIG. 16, taken from the direction x-x.
Figure 16:
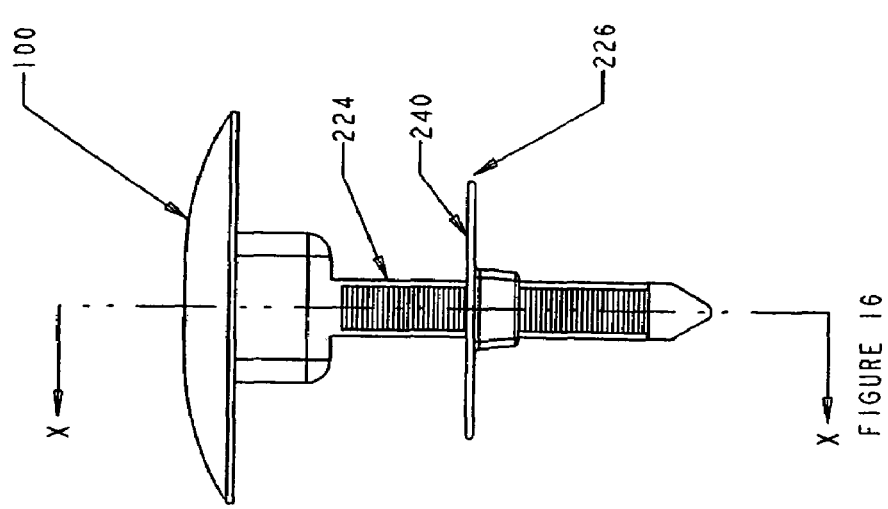
FIG. 16 is a side view of the integrally coupled cap structure, stem extender and locking member of FIG. 15.

The one-piece cap structure includes a stem 120 extending away from the underside of the hood 110. The recess 106 extends at least partially into the stem, so that the part of the stem that inserts into the water meter cover access opening 102 is relatively thin walled and flexible. The thin wall sections of the stem 120 have external barbs or hooks 122 (FIGS. 3, 7). The barbs 122 include (a) angular surface portions 124 that engage the wall 126 of the access opening 102 as the stem is being inserted into the access opening (FIG. 7), and (b) locking portions 128 that align with the underside 130 of the cover, once the stem 120 has been inserted fully into the cover access opening (FIG. 8). The relatively thin wall sections of the stem 120 enable portions of the stem resiliently to flex inward during insertion of the stem into the meter cover access opening (FIG. 7). Once the barbs 122 have cleared the underside 130 of the cover 104, the flexibility of the stem enables the barbs resiliently to return to a locking position, in which the locking portions 128 of the barbs are aligned with the underside 130 of the cover and couple the cap structure to the cover (FIG. 8).

The hood 110, which is generally domed shaped, has a narrowed portion 132 near its perimeter 111. That narrowed portion 132 provides the hood with flexibility, particularly near the perimeter of the hood, as the stem 120 is being pressed into the access opening 102 in the cover 104. That flexibility of the hood, enables the hood to substantially flatten against the cover as the cap structure is being coupled to the cover (see FIG. 8), thereby creating a very low profile, and as continuous a surface as possible, which is beneficial when used with meter boxes located near walkways and drives. In addition, the depth of the recess 106, which makes most of the stem 120 thin walled and flexible, and the flexibility of the hood 110, enables the barrier device 100 to be effectively coupled to water meter covers whose thickness may vary over a predetermined range.

The leading surface 140 of the stem is preferably rounded to aid in the ease of insertion of the stem into the access opening in a water meter cover. The barbs 122 have the angular surface portions 124 so that as the stem is being inserted into the access opening, the angular surface portions engage the wall 126 of the access opening in the water meter cover, and cause the stem wall to flex inwardly during insertion of the stem. The capability of the stem wall to flex inwardly enables the stem to accommodate varying meter access opening widths as the stem is being inserted into an access opening. The relatively narrow portions 132 of the domed hood near the perimeter of the hood can distort to a degree to allow the barbs to pass completely through the access opening in the water meter cover and resiliently snap outward to the locking position of FIG. 8 when the barbs have cleared the bottom 130 of the cover 104. When the barbs are in the locking position of FIG. 8, the barrier device is tightly and essentially permanently coupled with the cover, and the recess 106 is resiliently restored to its original form to allow access of the lifting tool 108.

Thus, as seen from the foregoing description, the barrier device of FIGS. 1-11 comprises a one piece cap structure 100 configured to be coupled to a water meter cover 104, to (a) cover the access opening 102 in a manner that provides a barrier to materials and objects passing through the tool access opening, and (b) provide structure for engagement by a tool 108, to enable a coupled cap structure and cover to be manipulated by the tool. The one-piece cap structure comprises a hood 110 and a stem 120 extending away from the hood. The stem 120 is configured to be pressed into the cover access opening 102 and includes structure (e.g. the barbs 122) configured to couple the barrier device to the water meter cover. The stem wall has a flexibility that enables it to flex as the stem is passing through the tool access opening 102 and to cause the coupling structure to return to the coupling position (FIG. 8) when the coupling structure has passed through the cover access opening. The stem 120 has a recess 106 with a closed end 112 that forms a barrier to passage of materials and objects through the stem. The outer wall 123 of the stem is closely spaced from the wall 126 of the cover access opening when the stem is fully inserted in the cover access opening, to provide a barrier to passage of objects and material between the stem and the cover opening. The hood 110 has a perimeter 111 and the configuration of the hood (e.g. the relatively thinner portion 132 near the perimeter) enables the hood to at least partially flatten against a water meter cover, as the barrier device is being coupled to the water meter cover. Thus, the perimeter of the hood and the water meter cover combine to form a barrier to materials and objects near the perimeter of the hood.

The one-piece cap structure of FIGS. 1-11 forms an effective barrier for covers (e.g. water meter covers) whose thickness varies over a predetermined range. As will be appreciated by those in the art, that predetermined range will primarily be determined by factors such as (a) the length of the stem, (b) the locations of the locking barbs, (c) the range of movement of the hood as it is compressed against the cover, and (d) the flexibility of the stem. However, there are some water meter covers that are substantially thicker than others, and for those thicker covers, the one piece cap structure 1-11 may still not be capable of being coupled to the covers. Therefore, and in accordance with another preferred embodiment of the present invention, additional structure is provided that can be integrally coupled with the barrier device of FIGS. 1-11, to further extend the thickness of fluid system covers with which the barrier device can be used. Such additional structure is shown in FIGS. 12a,b; 13a,b; 14a,b; and 15-22.

Specifically, the additional structure essentially extends the length of the stem (thereby providing an extended cap structure), and also provides a locking member that couples the extended cap structure to the thicker cover. The structure for extending the stem comprises an extender 224 and the locking member comprises a snap on member 226 that is coupled to the extender 224 and is adapted to be disposed against the bottom of the thicker cover, to couple the extended cap structure to the thicker cover.

The extender 224 is a one piece element (preferably molded of nylon, or from the same synthetic resin [polypropylene] used to form the cap structure). The extender has a main body portion 227 (sometimes referred to herein as a "strap"), a top portion 228 at the top end of the strap, and a pointed portion 230 at the bottom of the strap 227. The strap 227 has a series of ratchet teeth 232, to enable the snap on member 226 to be coupled to the strap, as described further below. The top portion 228 has curved upper and lower surfaces 234, 236, respectively. The lower surface 236 has a curvature that generally matches the curvature of the bottom wall 150 of the closed end 112 of the recess 106, for reasons described further below. The pointed portion 230 at the bottom of the strap 227 is designed to pierce the closed end 112 of the recess 106, when the extender 224 is being coupled to the cap structure 100.

The locking member 226 is a one piece element, formed of the same synthetic resin (e.g. nylon, polypropylene) used to form the extender. The locking member 226 is configured with a relatively flat, disc shaped portion locking portion 240 and a raised portion 242 with a passageway 244 shaped to receive the strap 227 of the extender. The passageway 244 includes internal ratchet teeth 246 that combine with the ratchet teeth 232 on the strap, to enable the snap on locking member 226 to move in one direction along the strap (i.e. in an upward direction in FIGS. 15-22), and to resist relative movement of the locking member in the opposite direction.

To couple the extender 224 to the cap structure 100, the extender 224 is inserted into the recess 106 in the cap structure, with the pointed portion 230 leading. The extender 224 is pressed into the recess 106 with sufficient force that the pointed portion 230 of the extender pierces the closed end 112 of the recess, and the strap 227 is pushed through the pierced recess, until the top portion 228 of the extender engages the bottom wall 150 of the pierced recess. At that point, the top portion 228 of the extender will close off the pierced recess, to prohibit ingress of dirt, debris, and animals through the recess. Specifically, the shape of the bottom surface 236 of the extender top portion 228, which is closely matched to the shape of the bottom wall 150 of the recess, enables the top portion of the extender 224 to effectively close off the pierced recess. In that condition, the part of the cap structure with the extender 224 is inserted into an access opening 260 in a thicker water meter cover 262 (see FIGS. 20-22). Once the cap structure (with the extender 224) has been fully inserted into the access opening 260 in the water meter cover 262, the locking member 226 is slid onto the bottom of the extender 224, and the ratched teeth 246 on the locking member 226 will ratchet over the ratchet teeth 232 of the strap 227 until the locking portion 240 is firmly pressed against the bottom 264 of the thicker cover 262 and the hood 110 of the cap structure 100 is flattened against the top 266 of the cover 262. At that point the hood of the cap structure, which is substantially flattened against the top 266 of the cover, will prevent ingress of dirt, debris, animals, etc. at the border 111 of the hood, as with the embodiment of FIGS. 1-11. The interaction between the ratchet teeth on the strap and the locking member, maintains the extended cap structure firmly coupled to the cover 262, so that the cap structure and the cover can be manipulated as a unit by a tool, in the same way as with the embodiment of FIGS. 1-11.

In the use of the barrier devices described above, there may be circumstances where the extender structure is provided as an option for extending a one piece cap structure as shown and described in FIGS. 1-11, in the event that a water meter cover is too thick for the one piece cap structure of FIGS. 1-11. There may be other circumstances where it is desirable to modify the stem of a one-piece cap structure that is specifically intended to be used with the extender structure described above. In those circumstances, the barbs on the stem are not necessary for locking the extended cap structure to the water meter cover. Accordingly, the one-piece cap structure can be formed (i.e. molded) either without the barbs, or with the barbs made as small as possible. Additionally, the one-piece cap structure can be molded such that rather than having a closed end 112 of the recess, the recess can have a distal end with a molded opening. With such a configuration, it is not necessary for the extender to pierce a closed end of the recess. Rather, the extender strap would be configured to extend through the molded opening in the distal end of the recess and close off the opening in the distal end of the recess in the same manner as if the extender had pierced the recess to form the opening. Thus, the extender would extend the stem of the cap structure in the manner described above, and the locking member would be configured to engage the extender in the manner described above, in a manner such that the locking member can move along the stem in a first direction for coupling the extended cap structure with a cover but the locking member cannot move along the stem in an opposite direction.

An alternative configuration for a locking member is shown in FIGS. 23-27. A locking member 300 is provided that is combined with a cap structure 302 and stem extender 304. The cap structure 302 and stem extender are similar to the cap structure and stem extender of FIGS. 12-22. The locking member 300 is also generally similar to the locking member of FIGS. 12-22, but the locking member 300 has a peripheral skirt 306, that extends from a relatively flat disk shaped portion 308, in the opposite direction from a raised portion 310. The disk shaped portion 308 and the raised portion 310 are generally similar to the embodiment of FIGS. 12-22. As with the embodiment of FIGS. 12-22, the raised portion 310 has a passageway configured to receive the strap of the stem extender, and to move along the strap in the first direction, for coupling the extended cap structure with a cover. Mover, the raised portion and strap have respective ratchet structure configured to enable the locking member 300 to move in the first direction along the strap and resisting movement of the locking member in the opposite direction along the strap. The raised portion 310, its respective ratchet structure, and the peripheral skirt are formed in one piece with the relatively flat disk shaped portion 308, and are preferably molded in one piece with the relatively flat disk shaped portion.

When a barrier device is formed with a locking member configured in FIGS. 23-27, and is coupled to a fluid system cover such as a water meter cover 312, the peripheral skirt 306 is pressed against the bottom 314 of the water meter cover. This type of locking member works particularly well with a water meter cover that is thick enough to require the use of a stem extender and locking member, but which may not be as thick as the type of water meter cover with which the locking member of FIGS. 12-22 works well. The skirt effectively extends the side of the locking member that engages the bottom of the water meter cover, so that if the water meter cover is slightly thinner, the skirt will take up the difference in thickness, and provide a locking member that can be effectively pressed against the bottom 314 of the water meter cover, to couple the cap structure with the water meter cover.

While the barrier device has been described above in connection with a water meter cover, it will be apparent to those in the art that the principles of the invention can be used to form a barrier device for various types of fluid system covers. For example, the principles of the present invention can be used to form a barrier device for use with fluid system covers for irrigation and pools, and for use with various other types of covers. The scope of this invention is limited only by the scope of the following claims.

The invention claimed is:

1. A barrier device for a utility system cover having a tool access opening, comprising a cap structure configured to (a) be coupled to a utility system cover, (b) cover a tool access opening in the utility system cover in a manner that provides a barrier to materials and objects passing through the tool access opening in the utility system cover, and (c) provide structure for engagement by a tool, to enable a coupled barrier device and cover to be manipulated by the tool;

wherein the cap structure comprises a hood and a stem extending away from the hood, the stem configured to be inserted into a tool access opening in a utility system cover and to couple the barrier device to the utility system cover, and the hood being configured to cover the tool access opening in the utility system cover when the cap structure is coupled to the utility system cover;

wherein extender structure is configured to be integrally coupled to the stem, to provide an extended cap structure that can be coupled to a cover, the extender structure comprising an extender and a locking member that can be coupled to the extender to couple the extended cap structure to a cover; the stem having a recess with a closed end and the extender comprising a strap configured to (a) pierce the closed end of the recess (b) extend through the pierced end of the recess and (c) close off the pierced end of the recess, thereby to extend the stem of the cap structure, and the locking member configured to engage the strap in a manner such that the locking member can move along the stem in a first direction for coupling the extended cap structure with a cover, wherein the stem has a distal end with an opening and the extender comprising a strap configured to extend through the opening in the distal end of the recess and to close off the opening in the distal end of the recess, thereby to extend the stem of the cap structure, wherein the locking member comprises a relatively flat portion with a raised portion having a passageway configured to receive the strap and to move along the strap in the first direction, for coupling the extended cap structure with a cover, wherein the raised portion and strap have respective ratchet structure configured to enable the locking member to move in the first direction along the strap and resisting movement of the locking member in the opposite direction along the strap, and wherein the raised portion extends in one direction from the relatively flat portion, and wherein the relatively flat portion has a peripheral skirt that extends in the opposite direction from the relatively flat portion, the locking member configured such that the peripheral skirt will engage the underside of a fluid system cover when the locking member moves in the first direction along the strap.

2. A barrier device as defined in claim 1, wherein the raised portion, its respective ratchet structure, and the peripheral skirt are formed in one piece with the relatively flat portion.

* * * * *